(12) United States Patent
Dong et al.

(10) Patent No.: US 10,909,203 B2
(45) Date of Patent: Feb. 2, 2021

(54) METHOD AND DEVICE FOR IMPROVING PAGE DISPLAY EFFECT VIA EXECUTION, CONVERSION AND NATIVE LAYERS

(71) Applicant: Beijing Xiaomi Mobile Software Co., Ltd., Beijing (CN)

(72) Inventors: Hongguang Dong, Beijing (CN); Hua Wu, Beijing (CN); Hongwei Fan, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/008,395

(22) Filed: Jun. 14, 2018

(65) Prior Publication Data
US 2020/0159789 A1 May 21, 2020

(30) Foreign Application Priority Data
Jun. 14, 2017 (CN) .......................... 2017 1 0454463

(51) Int. Cl.
*G06F 16/00* (2019.01)
*G06F 16/954* (2019.01)
(Continued)

(52) U.S. Cl.
CPC ...... *G06F 16/954* (2019.01); *G06F 16/24564* (2019.01); *G06F 16/9027* (2019.01); *G06F 16/9577* (2019.01)

(58) Field of Classification Search
None
See application file for complete search history.

(56) References Cited

U.S. PATENT DOCUMENTS 8,490,117 B1* 7/2013 Brichford ........... G06F 9/45512
719/328
8,806,333 B2* 8/2014 Bourke ................... G06F 9/455
715/248
(Continued)

FOREIGN PATENT DOCUMENTS

CN 106528601 A 3/2017

OTHER PUBLICATIONS

Janne Warén "Cross-platform mobile software development with React Native", Bachelor's thesis, Retrieved from the Internet (Year : 2016).*

(Continued)

*Primary Examiner* — Polina G Peach
(74) *Attorney, Agent, or Firm* — Oblon, McClelland, Maier & Neustadt, L.L.P.

(57) ABSTRACT

The disclosure relates to a method and device for page display, and a storage medium. The method includes parsing, by a JavaScript execution layer, a designated webpage that was requested to be displayed; acquiring, by the JavaScript execution layer, a JavaScript file from the designated webpage; generating, by the JavaScript execution layer, a virtual tree structure; transmitting, by the JavaScript execution layer, a first drawing message to the conversion layer during execution of the JavaScript file, the first drawing message comprising the virtual tree structure comprising a plurality of elements, wherein each of the plurality of elements is described by a JavaScript statement; converting, by a conversion layer, the plurality of elements in the virtual tree structure into a plurality of first views recognizable by the native layer; transmitting, by the conversion layer, the plurality of first views to the native layer; and performing, by a native layer, the page display based on the plurality of first views.

15 Claims, 7 Drawing Sheets

(51) Int. Cl.
*G06F 16/957* (2019.01)
*G06F 16/901* (2019.01)
*G06F 16/2455* (2019.01)
*G06F 17/00* (2019.01)

(56) References Cited

U.S. PATENT DOCUMENTS

| | | | | |
|---|---|---|---|---|
| 9,501,459 | B2* | 11/2016 | Kamada | G06F 11/3688 |
| 9,760,236 | B2* | 9/2017 | Sivakumar | G06F 9/451 |
| 10,379,846 | B1* | 8/2019 | Mercille | G06F 8/65 |
| 10,534,830 | B2* | 1/2020 | Fanning | G06F 16/322 |
| 10,565,293 | B2* | 2/2020 | Umapathy | G06F 40/14 |
| 2006/0168536 | A1* | 7/2006 | Portmann | G06F 9/451 |
| | | | | 715/762 |
| 2008/0104025 | A1* | 5/2008 | Dharamshi | G06F 16/986 |
| 2012/0331375 | A1* | 12/2012 | Fanning | G06F 16/986 |
| | | | | 715/234 |
| 2013/0047149 | A1* | 2/2013 | Xu | G06F 21/53 |
| | | | | 717/175 |
| 2013/0067432 | A1* | 3/2013 | Feies | G06F 8/38 |
| | | | | 717/107 |
| 2014/0047323 | A1* | 2/2014 | Bourke | G06F 9/542 |
| | | | | 715/234 |
| 2014/0136954 | A1* | 5/2014 | Ligman | G06F 40/14 |
| | | | | 715/234 |
| 2014/0164944 | A1* | 6/2014 | Sivakumar | G06F 16/9577 |
| | | | | 715/746 |
| 2014/0281897 | A1* | 9/2014 | Goodger | G06F 9/455 |
| | | | | 715/234 |
| 2015/0248468 | A1* | 9/2015 | Cheng | H04L 67/1095 |
| | | | | 707/621 |
| 2015/0286739 | A1* | 10/2015 | Xie | G06F 16/9577 |
| | | | | 715/239 |
| 2016/0054985 | A1* | 2/2016 | Cragun | G06F 11/36 |
| | | | | 715/762 |
| 2018/0307465 | A1* | 10/2018 | He | G06F 40/205 |

OTHER PUBLICATIONS

Extended European Search Report dated Oct. 25, 2018 in Patent Application No. 18177433.2.
Janne Warén, "Cross-platform mobile software development with React Native", Haaga-Helia, University of Applied Science, XP055516061, 2016, 30 pages.
Combined Chinese Office Action and Search Report dated Feb. 3, 2020 in Chinese Patent Application No. 201710454463.9 (with English translation and English translation of Category of Cited Documents), 18 pages.

* cited by examiner

METHOD AND DEVICE FOR IMPROVING PAGE DISPLAY EFFECT VIA EXECUTION, CONVERSION AND NATIVE LAYERS

CROSS-REFERENCE TO RELATED APPLICATIONS

This application is based on and claimed priority to Chinese Patent Application No. 201710454463.9, filed on Jun. 14, 2017, the entire contents of which are incorporated herein by reference.

TECHNICAL FIELD

The present disclosure generally relates to a field of computer technology, and more particularly to a method for page display, a device for page display, and a storage medium.

BACKGROUND

With the development of computer technology, a variety of webpage applications have been developed in order to facilitate the use of webpages by a user. As the user is browsing a page of a webpage application, the effect and performance of page display directly affects the user's browsing experience. As such, improvements to page display performance and the resulting effect on the user are important to improve the user's browsing experience.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for page display applied in a device comprising a JavaScript execution layer, a conversion layer and a native layer. The method includes parsing, by the JavaScript execution layer, a designated webpage that was requested to be displayed; acquiring, by the JavaScript execution layer, a JavaScript file from the designated webpage; generating, by the JavaScript execution layer, a virtual tree structure; transmitting, by the JavaScript execution layer, a first drawing message to the conversion layer during execution of the JavaScript file, the first drawing message comprising the virtual tree structure comprising a plurality of elements, wherein each of the plurality of elements is described by a JavaScript statement; converting, by the conversion layer, the plurality of elements in the virtual tree structure into a plurality of first views recognizable by the native layer; transmitting, by the conversion layer, the plurality of first views to the native layer; and performing, by the native layer, the page display based on the plurality of first views.

In an example, when transmitting the first drawing message to the conversion layer, the method includes invoking, by the JavaScript execution layer, a communication interface between the JavaScript execution layer and the conversion layer so as to transmit the first drawing message to the conversion layer.

In another example, when converting, by the conversion layer, the plurality of elements in the virtual tree structure into the plurality of first views recognizable by the native layer, the method includes converting, by the conversion layer, the plurality of elements in the virtual tree structure into the plurality of first views recognizable by the native layer based on a rule database that is stored with a correspondence between the JavaScript statements and the plurality of first views.

According to an aspect, the method further includes updating, by the conversion layer, the rule database according to an updated JavaScript statement and an updated view when the updated JavaScript statement and the updated view are acquired.

According to another aspect, the method includes transmitting, by the native layer, a notification message to the JavaScript execution layer when a triggering operation is detected on the designated webpage, the notification message comprising a changed element identifier; modifying, by the JavaScript execution layer, the virtual tree structure; transmitting, by the JavaScript execution layer, a second drawing message to the conversion layer according to the changed element identifier, the second drawing message comprising the modified virtual tree structure; converting, by the conversion layer, the plurality of elements in the modified virtual tree structure into a plurality of second views recognizable by the native layer; transmitting, by the conversion layer, the plurality of second views to the native layer; and performing, by the native layer, the page display based on the plurality of second views.

In an example, when transmitting, by the native layer, the notification message to the JavaScript execution layer, the method includes invoking, by the native layer, a communication interface between the native layer and the JavaScript execution layer so as to transmit the notification message to the JavaScript execution layer.

Aspects of the disclosure also provide a device for page display. The device includes a processor and a memory for storing instructions executable by the processor. The processor is configured to parse, by a JavaScript execution layer, a designated webpage that was requested to be displayed; acquiring, by the JavaScript execution layer, a JavaScript file from the designated webpage; generate, by the JavaScript execution layer, a virtual tree structure; transmit, by the JavaScript execution layer, a first drawing message to a conversion layer during execution of the JavaScript file, the first drawing message comprising the virtual tree structure comprising a plurality of elements, in which each of the plurality of elements is described by a JavaScript statement; convert, by the conversion layer, the plurality of elements in the virtual tree structure into a plurality of first views recognizable by a native layer; transmit, by the conversion layer, the plurality of first views to the native layer; and perform, by the native layer, the page display based on the plurality of first views.

Aspects of the disclosure also provide a non-transitory computer-readable storage medium storing instructions that, when executed by one or more processors of a device for page display, cause the device to parse, by the JavaScript execution layer, a designated webpage that was requested to be displayed; acquire, by the JavaScript execution layer, a JavaScript file from the designated webpage; generate, by the JavaScript execution layer, a virtual tree structure; transmit, by the JavaScript execution layer, a first drawing message to the conversion layer during execution of the JavaScript file, the first drawing message comprising the virtual tree structure comprising a plurality of elements, wherein each of the plurality of elements is described by a JavaScript statement; convert, by the conversion layer, the plurality of elements in the virtual tree structure into a plurality of first views recognizable by the native layer;

transmit, by the conversion layer, the plurality of first views to the native layer; and perform, by the native layer, the page display based on the plurality of first views.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

Figure 1:
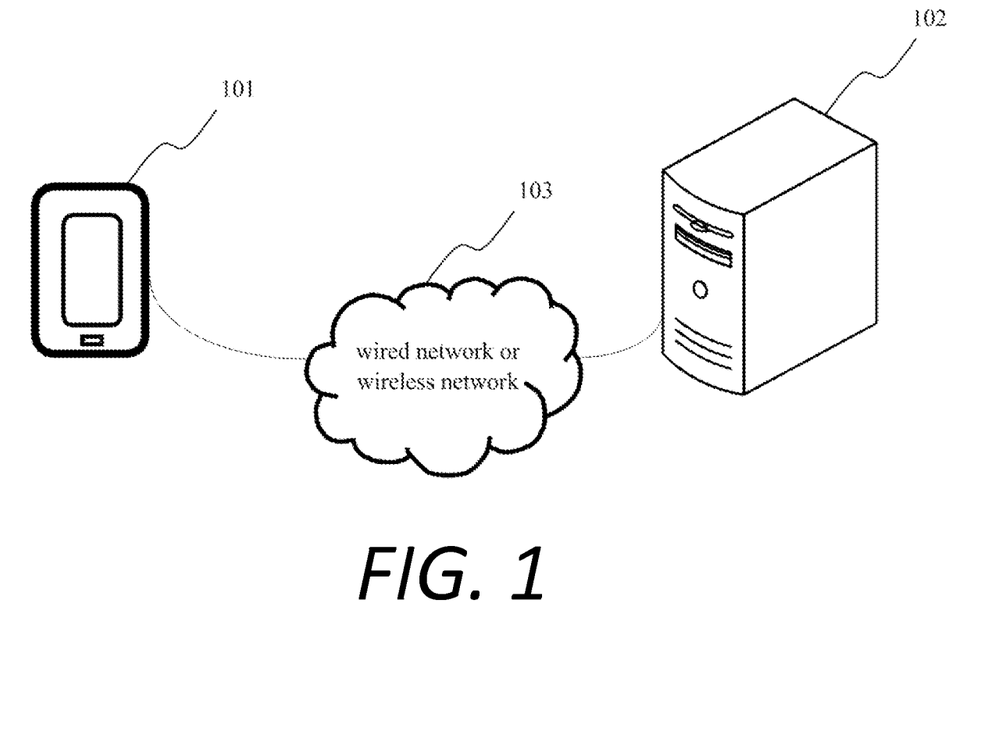
FIG. 1 is an implementation environment related to a method for page display, according to an exemplary aspect of the present disclosure.

FIG. 1 is an implementation environment related to a method for page display, according to an exemplary aspect. The implementation environment includes a terminal 101.

The terminal 101 may be a device such as a smart phone, a tablet computer, a notebook computer, etc. The product forms of the terminal 101 are not specifically defined by the aspects of the present disclosure. The terminal 101 is able to run and display a webpage corresponding to the webpage application. Specifically, the web application is searched by the terminal in a global search box provided by an operating system, and then a webpage corresponding to the webpage application is run and displayed after detecting a click operation applied to the webpage. The terminal 101 may also run and display the webpage corresponding to the page application after detecting a click operation applied to a shortcut icon of the page application. In order to improve the display effect, the terminal 101 includes a page display device including a JavaScript execution layer, a conversion layer and a native layer.

The JavaScript execution layer is a logical layer provided by a terminal operating system and being capable of executing a JavaScript statement. The JavaScript execution layer is able to parse a webpage so as to acquire a JavaScript file, and generate a virtual tree structure according to the JavaScript file. The JavaScript execution layer can also modify the virtual tree structure so that the user's current display requirements are satisfied by the modified virtual tree structure.

The conversion layer is a service layer provided by the terminal operating system and being capable of performing statement conversion. The conversion layer may be a separate service layer in the operating system or a sub-layer being responsible for the statement conversion in the native layer, and is not limited by the aspects in the present disclosure. The conversion layer is stored with a correspondence between the JavaScript statements and the views, and is capable of converting the virtual tree structure transmitted by the JavaScript execution layer into a view recognizable by the native layer, thus realizing the conversion of a webpage to a native page.

The native layer is a service layer provided by the terminal operating system and being capable of page rendering. The native layer is capable of invoking a communication interface provided by the operating system so as to trigger the operating system to perform page rendering. The native layer is also able to transmit a notification message to the JavaScript execution layer after a trigger operation for the currently displayed page is detected, such that the JavaScript execution layer modifies the virtual tree structure and re-execute the page rendering logic.

The above-described implementation environment may also include a server 102. The server 102 is a background server corresponding to the webpage application. The server 102 is configured to provide HTML5 (HyperText Markup Language) data and JavaScript files to the terminal 101.

In an aspect of the present disclosure, the terminal 101 and the server 102 may communicate with each other via a wired network or a wireless network 103 so as to ensure that the terminal 101 may obtain data necessary for displaying the webpage application from the server 102.

Figure 2:
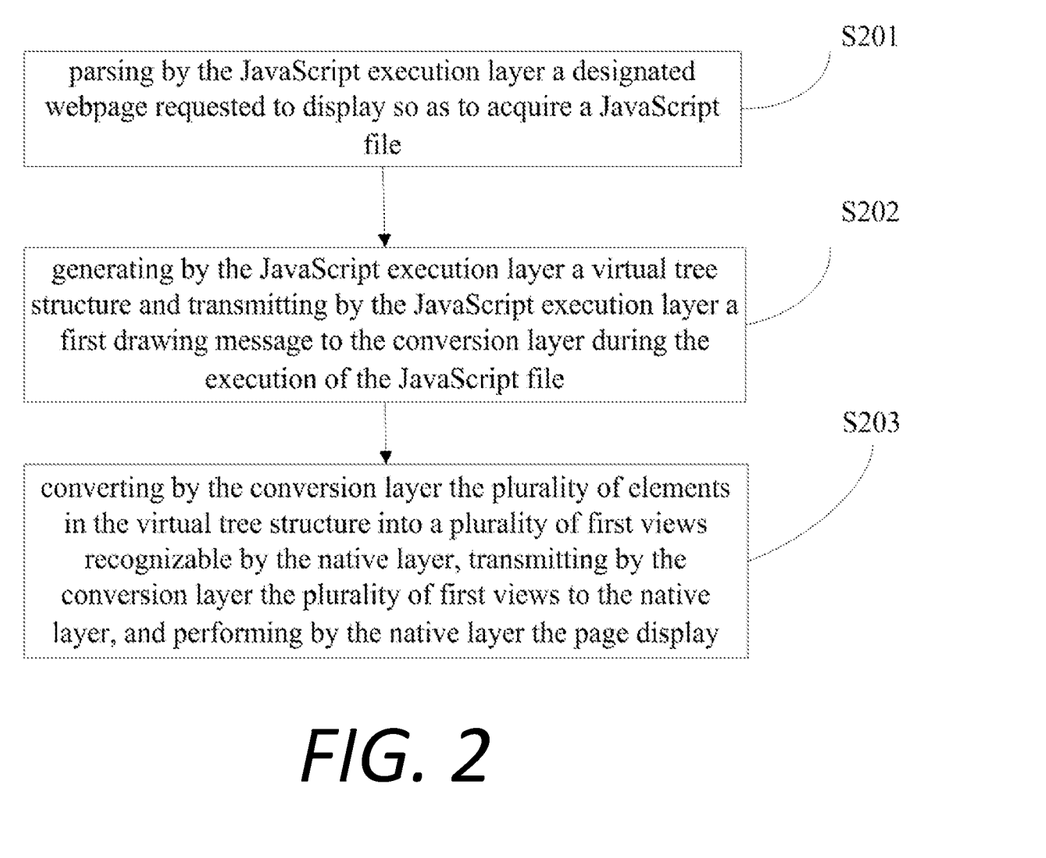
FIG. 2 is a flow chart showing a method for page display, according to an exemplary aspect of the present disclosure.

FIG. 2 is a flow chart showing a method for page display, according to an exemplary aspect. Referring to FIG. 2, a method for page display is applied in a terminal including a device for page display, the device for page display includes a JavaScript execution layer, a conversion layer and a native layer, and the method includes the following steps.

In step S201, the JavaScript execution layer parses a designated webpage requested to display, so as to acquire a JavaScript file.

In step S202, the JavaScript execution layer generates a virtual tree structure and transmits a first drawing message to the conversion layer during the execution of the JavaScript file.

In step S203, the conversion layer converts a plurality of elements in the virtual tree structure into a plurality of first views recognizable by the native layer, and transmits the plurality of first views to the native layer, and the page display is performed by the native layer.

With the method according to the aspects of the present disclosure, in the present disclosure, a conversion layer converts a plurality of elements in a virtual tree structure into a plurality of first views recognizable by a native layer, and the native layer displays a webpage according to the first views. In this process, a display form of the designated webpage is converted from a webpage into a native page by performing statement conversion, providing not only a new method for page display but also a better effect for page display.

In another aspect of the present disclosure, transmitting a first drawing message to the conversion layer includes: invoking by the JavaScript execution layer a communication interface between the JavaScript execution layer and the conversion layer so as to transmit the first drawing message to the conversion layer.

In another aspect of the present disclosure, converting by the conversion layer the plurality of elements in the virtual tree structure into a plurality of first views recognizable by the native layer includes:
converting by the conversion layer the plurality of elements in the virtual tree structure into the plurality of first views recognizable by the native layer based on a prebuilt rule database, the rule database being stored with a correspondence between the JavaScript statements and the views.

In another aspect of the present disclosure, the method further includes: updating by the conversion layer the rule database according to the updated JavaScript statement and the updated view when the updated JavaScript statement and the updated view are acquired.

In another aspect of the present disclosure, the method further includes: transmitting by the native layer a notification message to the JavaScript execution layer when a triggering operation is detected on the designated webpage, the notification message including a changed element identifier;
modifying by the JavaScript execution layer the virtual tree structure and transmitting by the JavaScript execution layer a second drawing message to the conversion layer according to the changed element identifier, the second drawing message including the modified virtual tree structure;
converting by the conversion layer the plurality of elements in the modified virtual tree structure into a plurality of second views recognizable by the native layer, transmitting by the conversion layer the plurality of second views to the native layer, and performing by the native layer the page display.

In another aspect of the present disclosure, transmitting by the native layer a notification message to the JavaScript execution layer includes:
invoking by the native layer a communication interface between the native layer and the JavaScript execution layer so as to transmit the notification message to the JavaScript execution layer.

All of the alternative technical solutions described above may be used in any combination to form alternative aspects of the present disclosure and will not be described in detail herein.

Figure 3A:
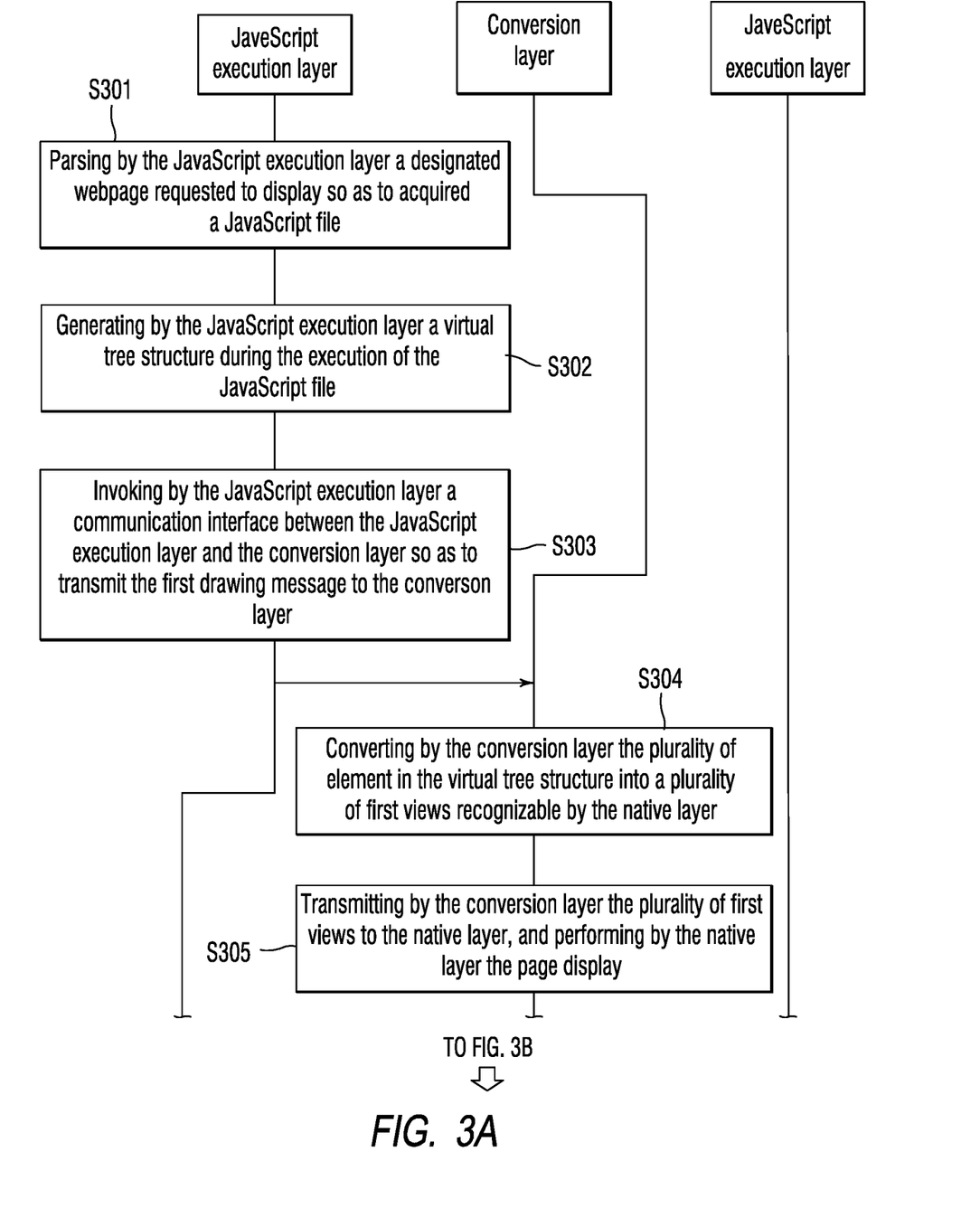
FIG. 3A is a flow chart showing a method for page display, according to an exemplary aspect of the present disclosure.
Figure 3B:
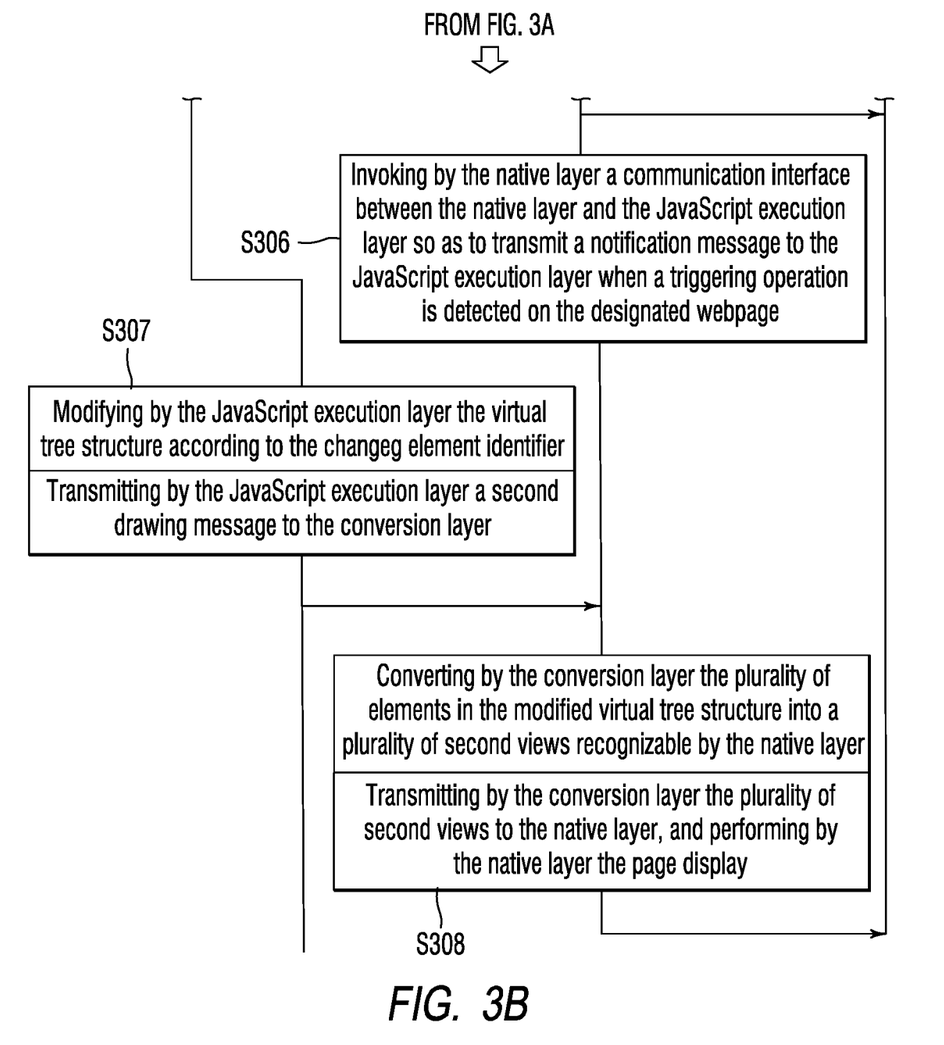
FIG. 3B is a flow chart showing a method for page display, which is a continuation of the flow chart shown in FIG. 3A, according to an exemplary aspect of the present disclosure.

FIG. 3A is a flow chart showing a method for page display, according to an exemplary aspect. FIG. 3B is a flow chart showing a method for page display, which is a continuation of the flow chart shown in FIG. 3A, according to an exemplary aspect of the present disclosure. Referring to FIGS. 3A and 3B, a method for page display is applied in a terminal including a device for page display, the device for page display includes a JavaScript execution layer, a conversion layer and a native layer, and the method includes the following steps.

In step S301, the JavaScript execution layer parses a designated webpage requested to display, so as to acquire a JavaScript file.

The designated webpage is one webpage in the webpage application. The designated webpage may be a webpage of level 1, 2 or more in the webpage application. When the designated webpage is a webpage of level 1, a source code of the designated webpage may be acquired in the following two manners.

In the first manner, in a process of browser startup, a user may input a name of a web application in a browser or a global search box of an operating system via a mouse and other devices according to his/her own reading requirements. When a click operation of the user to a webpage application link displayed in the browser or the global search box of the terminal is detected, the terminal generates a display request for the designated webpage, and may acquire a source code of the designated webpage from the server upon triggering of the display request for the designated webpage. The display request for the designated webpage at least carries attribute information of the designated webpage, including webpage identifier, webpage type, webpage size and the like. The source code of the designated webpage includes JavaScript codes and HTML5 data.

In the second manner, if a designated webpage link is stored in a local memory of the terminal (for example, a short-cut icon and the like corresponding to the designated webpage is displayed on the desktop), the terminal may generate a display request for the designated webpage when a user's click operation for the short-cut icon is detected, and may acquire the source code of the designated webpage from the server upon triggering the display request for the designated webpage.

When the designated webpage is a webpage of level 2 or more, the source code of the designated webpage may be acquired in the following manner. When a click operation for any item (a title or an icon having webpage link nature, etc.) of the webpage of level 1 in the webpage application is detected, the terminal may generate a display request for the designated webpage, and may acquire the source code of the designated webpage from the server upon triggering the display request for the designated webpage.

Upon triggering the display request for the designated webpage, the JavaScript execution layer in the terminal performs a JavaScript parsing on a designated webpage requested to display so as to acquire a JavaScript file, and the JavaScript file includes the logical code for the entire page display process.

In step S302, the JavaScript execution layer generates a virtual tree structure during the execution of the JavaScript file.

The JavaScript execution layer may perform a HTML parsing on the HTML5 data to generate a virtual tree structure during the execution of the JavaScript file. The virtual tree structure includes a plurality of elements. The elements are data used to describe the webpage attribute information, web content, etc. in the designated webpage, and each of the elements is described by JavaScript statements. In the aspects of the present disclosure, the virtual tree structure may be a VDOM (Virtual Document Object Model) tree.

In step S303, the JavaScript execution layer invokes a communication interface between the JavaScript execution layer and the conversion layer so as to transmit a first drawing message to the conversion layer.

Since each element in the virtual tree structure is described by JavaScript statements, the JavaScript statements may not be recognized by the native layer, resulting in the virtual tree structure being converted into a tree structure recognizable by a rendering engine after the virtual tree structure is acquired, and then rendered by the rendering engine into a webpage for display. The resulting effect of page display is not good because the page displayed in the process is a webpage.

In order to improve the effect of page display, restore real forms of the webpage to the utmost extent, and simultaneously create a real experience of installing the webpage application for the user, in the method according to the aspects of the present disclosure, after the JavaScript execution layer generates the virtual tree structure, the JavaScript execution layer further generates the first drawing message, and then transmits the first drawing message to the conversion layer, in which the first drawing message includes the virtual tree structure, etc., for triggering the conversion layer to perform statement conversion so as to display a native page corresponding to the designated webpage. Further, in the aspects of the present disclosure, a communication interface capable of realizing communication between the JavaScript execution layer and the conversion layer is provided. Based on this communication interface, the JavaScript execution layer may invoke a communication interface between the JavaScript execution layer and the conversion layer when transmits the first drawing message to the conversion layer.

In step S304, the conversion layer converts the plurality of elements in the virtual tree structure into a plurality of first views recognizable by the native layer.

For many applications, an R&D personnel usually develops two types, one type is a webpage application without need to be installed, the other type is an application which needs to be installed. In this way, there are the HTML5 data and the JavaScript codes recognizable by the rendering engine and views recognizable by the native layer of the terminal for the same application. In the actual use, the R&D personnel is difficult to know which type of the application specifically used by a user, and therefore the R&D personnel will usually package HTML5 data, JavaScript files and views together into the developed application. In this way, when a user browses a webpage corresponding to the webpage application, the conversion layer in the terminal may acquire the JavaScript statements and views from data parsed by the JavaScript execution layer. The conversion layer may build a rule database based on the acquired JavaScript statements and views. The rule database is stored with a correspondence between the JavaScript statements and the views. In order to facilitate subsequent applications, the conversion layer will further store the built rule database.

When the conversion layer converts the plurality of elements in the virtual tree structure into the plurality of first views recognizable by the native layer based on a prebuilt rule database, the conversion layer may acquire the views corresponding to the JavaScript statement for describing each element in the virtual tree structure, and take the acquired view as the first view.

Because the JavaScript statement is not fixed, in order to ensure the real-time validity of the rule database, the conversion layer updates the rule database according to the updated JavaScript statement and the updated view after the updated JavaScript statement and the updated view are acquired.

In step S305, the conversion layer transmits the plurality of first views to the native layer, and the page display is performed by the native layer.

According to an aspect of the present disclosure, a communication interface capable of realizing the communication between the conversion layer and the native layer is provided. The conversion layer may transmit to the native layer the plurality of first views converted from the plurality of elements in the virtual tree structure based on the communication interface, and then the page display is performed by the native layer. Specifically, the webpage may be displayed by the native layer in the following manner: the native layer invokes API (Application Programming Interface) of Native GUI (Graphical User Interface) of the operating system to render the designated webpage so as to acquire a native page corresponding to the designated webpage, and then the native page is displayed.

In step S306, the native layer invokes a communication interface between the native layer and the JavaScript execution layer so as to transmit a notification message to the JavaScript execution layer when a triggering operation is detected on the designated webpage.

The triggering operation includes, but is not limited to, a slide operation and a click operation, etc. The content displayed on the native page will be changed when a slide operation for the native page is detected or a click operation of any one of webpage links on the native page during the display of the native page corresponding to the designated webpage. At this time, the native layer transmits a notification message to the JavaScript execution layer, and the notification message is configured to re-trigger the above page display logic so that the displayed webpage satisfies the user's current browsing requirements. The notification message includes a changed element identifier and an operation type including an adding operation, a deletion operation, and the like.

When the native layer transmits the notification message to the JavaScript execution layer, the native layer may invoke the communication interface between the native layer and the JavaScript execution layer so as to transmit the notification message to the JavaScript execution layer.

In step S307, the JavaScript execution layer modifies the virtual tree structure and transmits a second drawing message to the conversion layer according to the changed element identifier.

After the notification message is received, the JavaScript execution layer modifies the virtual tree structure according to the operation type of an element corresponding to the changed element identifier. For example, if the operation type is a delete operation, the JavaScript execution layer will delete the element in the virtual tree structure that corresponds to the element identifier; and if the operation type is an adding operation, the JavaScript execution layer will add the element in the virtual tree structure that corresponds to the element identifier.

The JavaScript execution layer generates a second drawing message including a modified virtual tree structure based on the modified virtual tree structure, and then invoking a communication interface between the JavaScript execution layer and the conversion layer so as to transmit the second drawing message to the conversion layer.

In step S308, the conversion layer converts the plurality of elements in the modified virtual tree structure into a plurality of second views recognizable by the native layer, and transmits the plurality of second views to the native layer, and then the page display is performed by the native layer.

After the second drawing message is received, the conversion layer converts the plurality of elements in the modified virtual tree structure into a plurality of second views recognizable by the native layer based on a prebuilt rule database.

Here, it should be noted that, the first view and the second view are only to indicate that the views corresponding to the different elements will change when the contents of page display are changed. In fact, the first view and the second view corresponding to the same element on the webpage are identical before and after a trigger operation.

After a plurality of second views are acquired, the conversion layer invokes a communication interface between the conversion layer and the native layer so as to transmit the plurality of second views to the native layer, and the page display is performed by the native layer according to the second view.

The above process will be described below with reference to FIG. 4 for ease of understanding.

Figure 4:
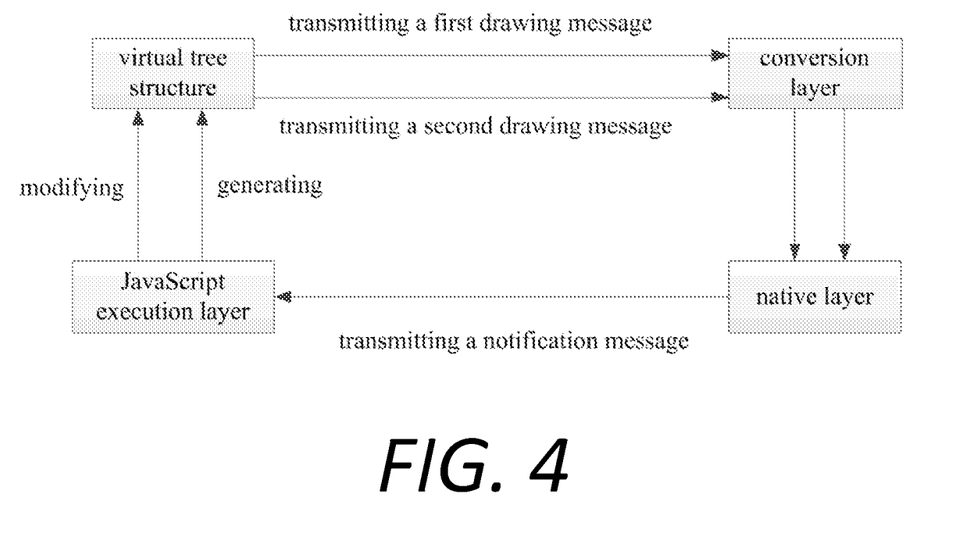
FIG. 4 is a schematic diagram showing a process for page display, according to an exemplary aspect of the present disclosure.

Referring to FIG. 4, when a webpage requested to display is acquired, the JavaScript execution layer parses the webpage requested to display so as to acquire a JavaScript file, generates a virtual tree structure and transmits a first drawing message including the virtual tree structure to the conversion layer by invoking a communication interface between the JavaScript execution layer and the conversion layer during the execution of the JavaScript file. After the first drawing message is received, the conversion layer converts the elements in the virtual tree structure into a first view recognizable by the native layer, and further transmits the first view to the native layer by invoking a communication interface between the conversion layer and the native layer, and the page display is performed by the native layer. When a click operation or a slide operation for the displayed webpage is detected, the native layer transmits a communication message to the JavaScript execution layer in order to trigger the JavaScript execution layer to modify the virtual tree structure, and then invokes the communication interface between the native layer and the conversion layer so as to transmit a second drawing message in the modified virtual tree structure to the conversion layer. When the second drawing message is received, the conversion layer converts the elements in the virtual tree structure into a second view recognizable by the native layer, and invokes the communication interface between the conversion layer and the native layer so as to transmit the second view to the native layer, and then the page display is performed by the native layer.

With the method according to the aspects of the present disclosure, in the present disclosure, a conversion layer converts a plurality of elements in a virtual tree structure into a plurality of first views recognizable by a native layer, and the page display is performed by the native layer according to the first views. In this process, a display form of the designated webpage is converted from a webpage into a native page by performing statement conversion, providing not only a new method for page display but also a better effect for page display.

Figure 5:
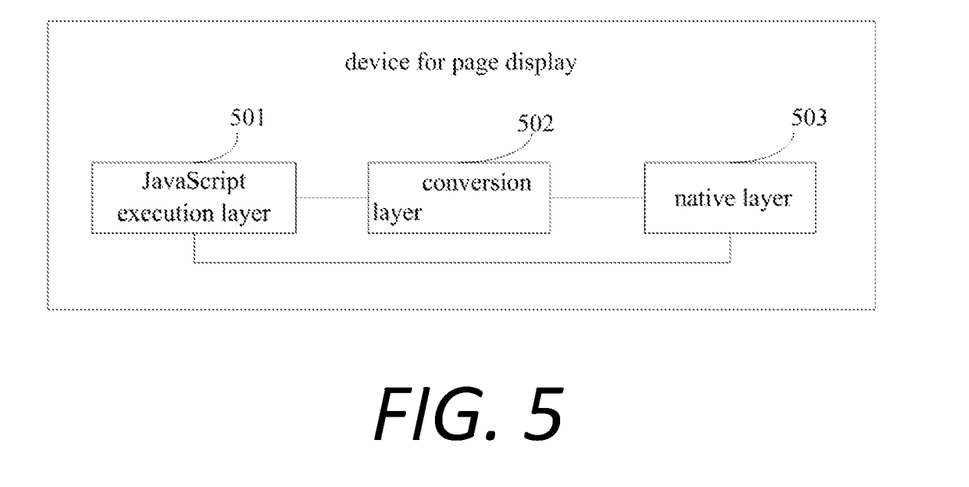
FIG. 5 is a block diagram of a device for page display, according to an exemplary aspect of the present disclosure.

FIG. 5 is a block diagram of a device for page display, according to an exemplary aspect. Referring to FIG. 5, a device for page display includes a JavaScript execution layer 501, a conversion layer 502 and a native layer 503.

The JavaScript execution layer 501 is configured to parse a designated webpage requested to display so as to acquire a JavaScript file.

The JavaScript execution layer 501 is further configured to generate a virtual tree structure and transmit a first drawing message to the conversion layer during the execution of the JavaScript file, the first drawing message including the virtual tree structure including a plurality of elements, in which each of the plurality of elements is described by a JavaScript statement.

The conversion layer 502 is configured to convert the plurality of elements in the virtual tree structure into a plurality of first views recognizable by the native layer and transmit the plurality of first views to the native layer.

The native layer 503 is configured to perform the page display.

In another aspect of the present disclosure, the JavaScript execution layer 501 is configured to invoke a communication interface between the JavaScript execution layer 501 and the conversion layer 502 so as to transmit the first drawing message to the conversion layer 502.

In another aspect of the present disclosure, the conversion layer 502 is configured to convert the plurality of elements in the virtual tree structure into the plurality of first views recognizable by the native layer based on a prebuilt rule database, a correspondence between the JavaScript statements and the views being stored in the rule database.

In another aspect of the present disclosure, the conversion layer 502 is configured to update the rule database according to the updated JavaScript statement and the updated view when the updated JavaScript statement and the updated view are acquired.

In another aspect of the present disclosure, the native layer 503 is configured to transmit a notification message to the JavaScript execution layer when a triggering operation is detected on the designated webpage, the notification message including a changed element identifier.

The JavaScript execution layer 501 is configured to modify the virtual tree structure and transmit a second drawing message to the conversion layer according to the changed element identifier, the second drawing message including the modified virtual tree structure.

The conversion layer 502 is configured to convert the plurality of elements in the virtual tree structure into a plurality of second views recognizable by the native layer 503 and transmit the plurality of second views to the native layer 503, and the native layer 503 is further configured to perform the page display.

In another aspect of the present disclosure, the native layer 503 is configured to invoke a communication interface between the native layer 503 and the JavaScript execution layer 501 so as to transmit the notification message to the JavaScript execution layer 501.

With the device according to the aspects of the present disclosure, in the present disclosure, a conversion layer converts a plurality of elements in a virtual tree structure into a plurality of first views recognizable by a native layer, and the page display is performed by the native layer according to the first views. In this process, a display form of the designated webpage is converted from a webpage into a native page by performing statement conversion, providing not only a new method for page display but also a better effect for page display.

With respect to the devices in the above aspects, the specific manners for performing operations for individual modules therein have been described in detail in the aspects regarding the methods for page display, which will not be elaborated herein.

Figure 6:
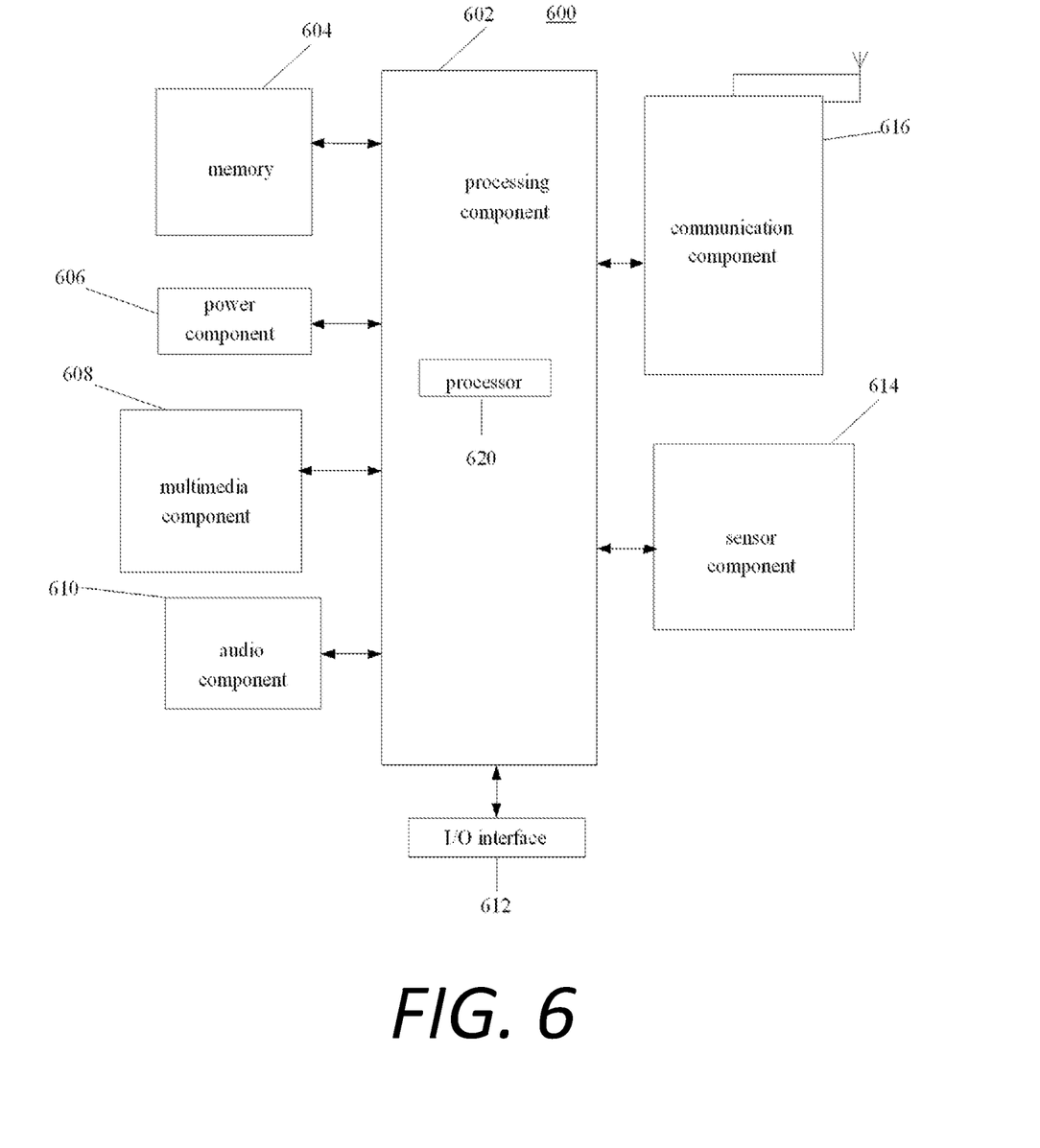
FIG. 6 is a block diagram of a device for page display, according to an exemplary aspect of the present disclosure.

FIG. 6 is a block diagram of a device 600 for page display, according to an exemplary aspect. For example, the device 600 may be a mobile phone, a computer, a digital broadcast terminal, a messaging device, a gaming console, a tablet, a medical device, exercise equipment, a personal digital assistant, and the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 800 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe operation, but also sense a period of time and a pressure associated with the touch or swipe operation. In some aspects, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the device 600 is in an operation mode, such as a call mode, a recording mode, and a voice recognition mode. The received audio signal may be further stored in the memory 604 or transmitted via the communication component 616. In some aspects, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some aspects, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, or 3G, or a combination thereof. In one exemplary aspect, the communication component 616 receives a broadcast signal or broadcast associated information from an external broadcast management system via a broadcast channel. In one exemplary aspect, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer-readable storage medium including instructions, such as included in the memory 604, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

With the device according to the aspects of the present disclosure, in the present disclosure, a conversion layer converts a plurality of elements in a virtual tree structure into a plurality of first views recognizable by a native layer, and the page display is performed by the native layer according to the first views. In this process, a display form of the designated webpage is converted from a webpage into a native page by performing statement conversion, providing not only a new method for page display but also a better effect for page display.

According to an aspect of the present disclosure, there is provided a computer-readable storage medium having stored therein at least one instruction that is configured to be loaded and executed by a processor so as to perform a method for page display described in FIG. 2 or FIGS. 3A and 3B.

With the computer-readable storage medium according to the aspects of the present disclosure, in the present disclosure, a conversion layer converts a plurality of elements in a virtual tree structure into a plurality of first views recognizable by a native layer, and the page display is performed by the native layer according to the first views. In this process, a display form of the designated webpage is converted from a webpage into a native page by performing statement conversion, providing not only a new method for page display but also a better effect for page display.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for page display applied in a device comprising an object-oriented programming language (OOPL) execution layer, a conversion layer and a native layer, the method comprising:
    parsing, by the OOPL execution layer, a designated webpage that was requested to be displayed;
    acquiring, by the OOPL execution layer, an OOPL file from the designated webpage;
    generating, by the OOPL execution layer, a virtual tree structure;
    transmitting, by the OOPL execution layer, a first drawing message to the conversion layer during execution of the OOPL file, the first drawing message comprising the virtual tree structure comprising a plurality of elements, wherein each of the plurality of elements is described by an OOPL statement;
    converting, by the conversion layer, the plurality of elements in the virtual tree structure into a plurality of first views recognizable by the native layer;
    transmitting, by the conversion layer, the plurality of first views to the native layer;
    performing, by the native layer, the page display based on the plurality of first views to display a native page corresponding to the designated webpage;
    transmitting, by the native layer, a notification message to the OOPL execution layer when a triggering operation is detected on the designated webpage, the notification message comprising a changed element identifier;
    modifying, by the OOPL execution layer, the virtual tree structure;
    transmitting, by the OOPL execution layer, a second drawing message to the conversion layer according to the changed element identifier, the second drawing message comprising the modified virtual tree structure;
    converting, by the conversion layer, the plurality of elements in the modified virtual tree structure into a plurality of second views recognizable by the native layer;
    transmitting, by the conversion layer, the plurality of second views to the native layer; and
    performing, by the native layer, the page display based on the plurality of second views,
    wherein converting, by the conversion layer, the plurality of elements in the virtual tree structure into the plurality of first views recognizable by the native layer comprises:
        converting, by the conversion layer, the plurality of elements in the virtual tree structure into the plurality of first views recognizable by the native layer based on a rule database that is stored with a correspondence between the OOPL statements and the plurality of first views, wherein converting, by the conversion layer, the plurality of elements in the virtual tree structure into the plurality of first views recognizable by the native layer based on the rule database comprises acquiring by the conversion layer a view corresponding to the OOPL statement for describing each element in the virtual tree structure, and taking the acquired view as the first view.

2. The method of claim 1, wherein transmitting the first drawing message to the conversion layer comprises:
    invoking, by the OOPL execution layer, a communication interface between the OOPL execution layer and the conversion layer so as to transmit the first drawing message to the conversion layer.

3. The method of claim 1, wherein the method further comprises:
    updating, by the conversion layer, the rule database according to an updated OOPL statement and an updated view when the updated OOPL statement and the updated view are acquired.

4. The method of claim 1, wherein transmitting, by the native layer, the notification message to the OOPL execution layer comprises:
    invoking, by the native layer, a communication interface between the native layer and the OOPL execution layer so as to transmit the notification message to the OOPL execution layer.

5. A device for page display, comprising:
    a processor;
    a memory for storing instructions executable by the processor;
    wherein the processor is configured to:
        parse, by an object-oriented programming language (OOPL) execution layer, a designated webpage that was requested to be displayed;
        acquire, by the OOPL execution layer, an OOPL file from the designated webpage;
        generate, by the OOPL execution layer, a virtual tree structure;
        transmit, by the OOPL execution layer, a first drawing message to a conversion layer during execution of the OOPL file, the first drawing message comprising the virtual tree structure comprising a plurality of elements, in which each of the plurality of elements is described by an OOPL statement;

convert, by the conversion layer, the plurality of elements in the virtual tree structure into a plurality of first views recognizable by a native layer;
transmit, by the conversion layer, the plurality of first views to the native layer;
perform, by the native layer, the page display based on the plurality of first views to display a native page corresponding to the designated webpage;
transmit, by the native layer, a notification message to the OOPL execution layer when a triggering operation is detected on the designated webpage, the notification message comprising a changed element identifier;
modify, by the OOPL execution layer, the virtual tree structure;
transmit, by the OOPL execution layer, a second drawing message to the conversion layer according to the changed element identifier, the second drawing message comprising the modified virtual tree structure;
convert, by the conversion layer, the plurality of elements in the modified virtual tree structure into a plurality of second views recognizable by the native layer;
transmit, by the conversion layer, the plurality of second views to the native layer; and
perform, by the native layer, the page display based on the plurality of second views,
wherein the processor is configured to convert, by the conversion layer, the plurality of elements in the virtual tree structure into a plurality of first views recognizable by the native layer by:
converting, by the conversion layer, the plurality of elements in the virtual tree structure into the plurality of first views recognizable by the native layer based on a rule database that is stored with a correspondence between the OOPL statements and the plurality of first views, wherein converting, by the conversion layer, the plurality of elements in the virtual tree structure into the plurality of first views recognizable by the native layer based on the rule database comprises acquiring by the conversion layer a view corresponding to the OOPL statement for describing each element in the virtual tree structure, and taking the acquired view as the first view.

6. The device of claim 5, wherein the processor is configured to transmit the first drawing message to the conversion layer by:
invoking, by the OOPL execution layer, a communication interface between the OOPL execution layer and the conversion layer so as to transmit the first drawing message to the conversion layer.

7. The device of claim 5, wherein the processor is further configured to:
update, by the conversion layer, the rule database according to an updated OOPL statement and an updated view when the updated OOPL statement and the updated view are acquired.

8. The device of claim 5, wherein the processor is configured to transmit, by the native layer, the notification message to the OOPL execution layer by:
invoking, by the native layer, a communication interface between the native layer and the OOPL execution layer so as to transmit the notification message to the OOPL execution layer.

9. A non-transitory computer-readable storage medium storing instructions that, when executed by one or more processors of a device for page display, cause the device to:

parse, by an object-oriented programming language (OOPL) execution layer, a designated webpage that was requested to be displayed;
acquire, by the OOPL execution layer, an OOPL file from the designated webpage;
generate, by the OOPL execution layer, a virtual tree structure;
transmit, by the OOPL execution layer, a first drawing message to the conversion layer during execution of the OOPL file, the first drawing message comprising the virtual tree structure comprising a plurality of elements, wherein each of the plurality of elements is described by an OOPL statement;
convert, by the conversion layer, the plurality of elements in the virtual tree structure into a plurality of first views recognizable by the native layer;
transmit, by the conversion layer, the plurality of first views to the native layer;
perform, by the native layer, the page display based on the plurality of first views to display a native page corresponding to the designated webpage;
transmit, by the native layer, a notification message to the OOPL execution layer when a triggering operation is detected on the designated webpage, the notification message comprising a changed element identifier;
modify, by the OOPL execution layer, the virtual tree structure;
transmit, by the OOPL execution layer, a second drawing message to the conversion layer according to the changed element identifier, the second drawing message comprising the modified virtual tree structure;
convert, by the conversion layer, the plurality of elements in the modified virtual tree structure into a plurality of second views recognizable by the native layer;
transmit, by the conversion layer, the plurality of second views to the native layer; and
perform, by the native layer, the page display based on the plurality of second views,
wherein the instructions cause the device to convert, by the conversion layer, the plurality of elements in the virtual tree structure into a plurality of first views recognizable by the native layer by:
converting by the conversion layer the plurality of elements in the virtual tree structure into the plurality of first views recognizable by the native layer based on a rule database that is stored with a correspondence between the OOPL statements and the plurality of first views, wherein converting, by the conversion layer, the plurality of elements in the virtual tree structure into the plurality of first views recognizable by the native layer based on the rule database comprises acquiring by the conversion layer a view corresponding to the OOPL statement for describing each element in the virtual tree structure, and taking the acquired view as the first view.

10. The non-transitory computer-readable storage medium of claim 9, wherein transmitting the first drawing message to the conversion layer comprises:
invoking, by the OOPL execution layer, a communication interface between the OOPL execution layer and the conversion layer so as to transmit the first drawing message to the conversion layer.

11. The non-transitory computer-readable storage medium of claim 9, wherein the instructions are further configured to cause the device to:

update, by the conversion layer, the rule database according to an updated OOPL statement and an updated view when the updated OOPL statement and the updated view are acquired.

12. The non-transitory computer-readable storage medium of claim 9, wherein transmitting, by the native layer, the notification message to the OOPL execution layer comprises:

Invoking, by the native layer, a communication interface between the native layer and the OOPL execution layer so as to transmit the notification message to the OOPL execution layer.

13. The method of claim 1, wherein the OOPL is JAVASCRIPT™.

14. The device of claim 5, wherein the OOPL is JAVASCRIPT™.

15. The non-transitory computer-readable storage medium of claim 9, wherein the OOPL is JAVASCRIPT™.

\* \* \* \* \*